US009325776B2

(12) United States Patent
Liu et al.

(10) Patent No.: US 9,325,776 B2
(45) Date of Patent: Apr. 26, 2016

(54) MIXED MEDIA COMMUNICATION

(71) Applicant: TangoMe, Inc., Palo Alto, CA (US)

(72) Inventors: Xu Liu, San Jose, CA (US); Jamie Odell, Foster City, CA (US); Gary Chevsky, Palo Alto, CA (US)

(73) Assignee: TangoMe, Inc., Mountain View, CA (US)

( * ) Notice: Subject to any disclaimer, the term of this patent is extended or adjusted under 35 U.S.C. 154(b) by 13 days.

(21) Appl. No.: 13/736,832

(22) Filed: Jan. 8, 2013

(65) Prior Publication Data

US 2014/0194152 A1 Jul. 10, 2014

(51) Int. Cl.
*H04W 4/12* (2009.01)
*H04L 29/08* (2006.01)
*H04L 29/06* (2006.01)
*H04L 12/58* (2006.01)
*H04M 3/53* (2006.01)
*H04W 4/18* (2009.01)
*H04L 12/18* (2006.01)
*H04M 1/725* (2006.01)

(52) U.S. Cl.
CPC ............... *H04L 67/06* (2013.01); *H04L 51/10* (2013.01); *H04L 65/1089* (2013.01); *H04L 65/403* (2013.01); *H04L 67/14* (2013.01); *H04M 1/72555* (2013.01); *H04M 3/5315* (2013.01); *H04L 12/1831* (2013.01); *H04M 1/7255* (2013.01); *H04W 4/185* (2013.01)

(58) Field of Classification Search
CPC .......... G06F 17/30038; G11B 27/034; H04N 5/772; H04N 1/001
USPC .......................................... 348/462; 709/217
See application file for complete search history.

(56) References Cited

U.S. PATENT DOCUMENTS

| | | | |
|---|---|---|---|
| 5,566,251 A * | 10/1996 | Hanna et al. ................... | 382/284 |
| 6,414,707 B1 | 7/2002 | Agraharam et al. | |
| 7,085,259 B2 * | 8/2006 | Wang et al. .................... | 370/352 |
| 8,375,283 B2 | 2/2013 | Fei et al. | |
| 8,560,641 B2 | 10/2013 | Kjesbu et al. | |
| 8,633,959 B2 | 1/2014 | An et al. | |
| 2006/0041632 A1* | 2/2006 | Shah et al. ..................... | 709/217 |
| 2007/0182822 A1* | 8/2007 | Hale et al. ................ | 348/207.99 |
| 2007/0242066 A1 | 10/2007 | Levy Rosenthal | |
| 2007/0293265 A1* | 12/2007 | Fei et al. ...................... | 455/556.1 |
| 2008/0090607 A1* | 4/2008 | Kraft et al. ................. | 455/556.1 |
| 2008/0094467 A1* | 4/2008 | An et al. ..................... | 348/14.02 |
| 2009/0109276 A1* | 4/2009 | Kim ........................... | 348/14.02 |
| 2009/0303199 A1* | 12/2009 | Cho et al. ....................... | 345/173 |
| 2011/0066684 A1 | 3/2011 | Dorso et al. | |
| 2011/0134206 A1* | 6/2011 | Kjesbu et al. .............. | 348/14.08 |
| 2012/0206560 A1 | 8/2012 | Setton | |

FOREIGN PATENT DOCUMENTS

KR       20120006675       1/2012

OTHER PUBLICATIONS

Photoshop CS3 User Guide, Adobe Systems Incorporated, May 2007.*
Adobe Photoshop Elements 6.0 User Guide, Adobe Systems Incorporated, Feb. 2008.*
"PCT/US2014/010556 International Search Report and Written Opinion", 8 pages.

* cited by examiner

*Primary Examiner* — William Nealon

(57) ABSTRACT

Methods and systems for communicating with a mixed media communication. An image is captured via an image capturing device associated with a device. An audio message is captured related to the image via a microphone associated with the device. A communication is sent from the device to a second device, wherein the communication comprises the image and the audio message, such that the second device will automatically display the image and play the audio message upon accessing the communication.

23 Claims, 6 Drawing Sheets

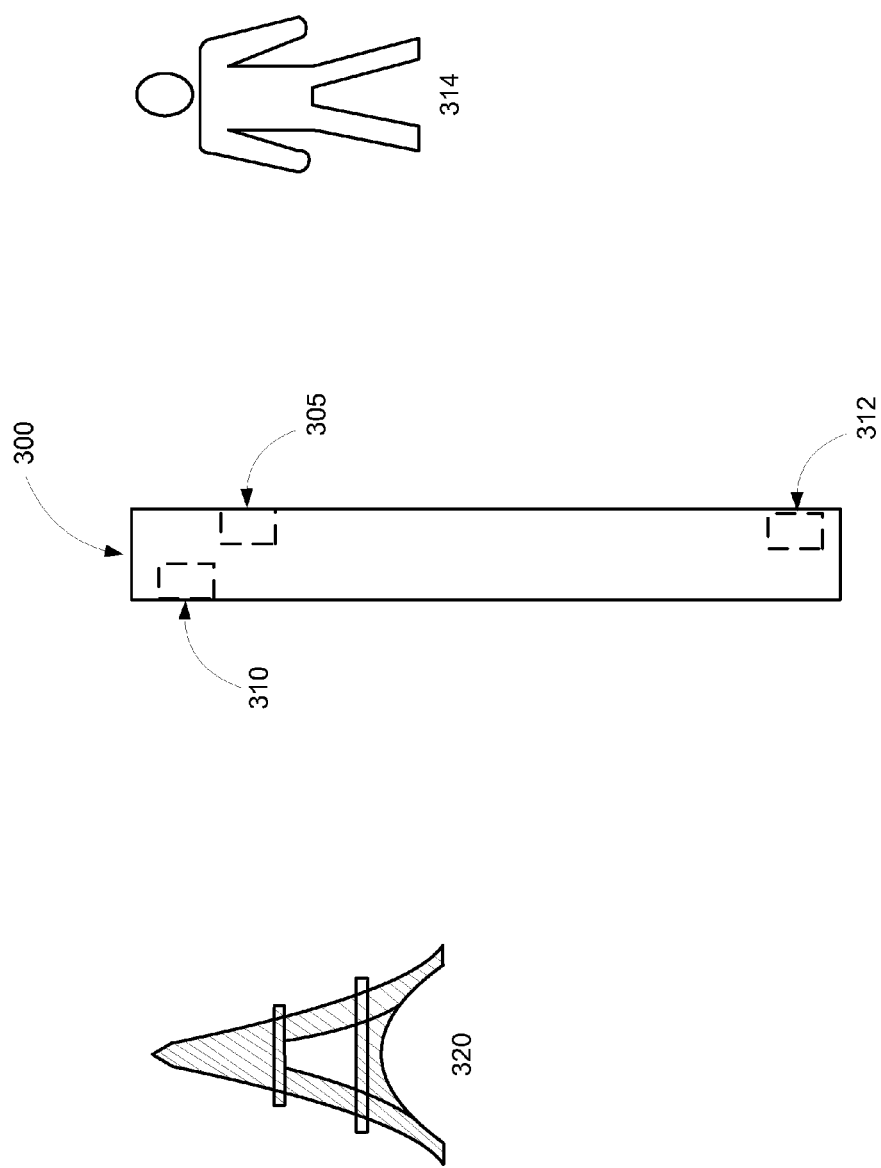

MIXED MEDIA COMMUNICATION

BACKGROUND

Modern technologies allow for various methods and techniques for communicating between two devices. Communications may be multimedia and may occur over a network. The communications may be limited by the technology such that a user may not be able to send the type of message desired and may not have desired flexibility in combining different media in a communication.

BRIEF DESCRIPTION OF THE DRAWINGS

FIG. 3A illustrates a block diagram of an example environment for communicating with a mixed media communication in accordance with embodiments of the present technology.

Figure 1:
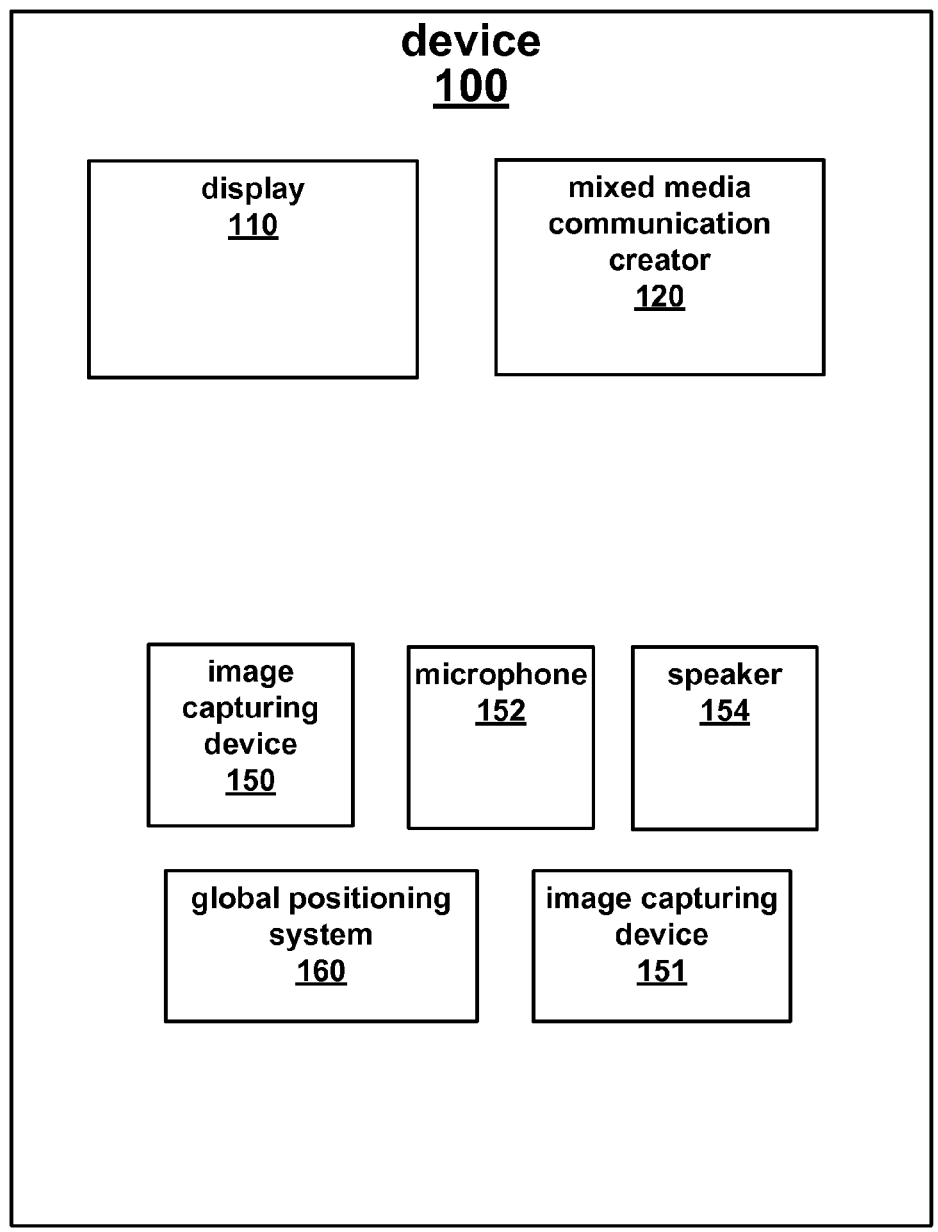
FIG. 1 illustrates a block diagram of an example device for communicating with a mixed media communication in accordance with embodiments of the present technology.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "capturing," "receiving," "sending," "creating," "filtering," "altering," "communicating," "changing," or the like, refer to the actions and processes of a computer system, or similar electronic computing device. The computer system or similar electronic computing device, such as a telephone, smartphone, or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of a Mixed Media Communication

Embodiments of the present technology are for a mixed media communication. The communication may be between two devices such as a cell phones, smart phones, computers, laptops, televisions, hand held electronic devices, etc. The devices are capable of capturing images and audio as well as displaying or playing images and audio. In one embodiment, the communication occurs over a network such as a cellular network, a wifi network, or other network used for communication.

The communication makes use of combination media available to a device. In one embodiment, the communication is a mixed media communication that comprises an image and a voice or audio message related to the picture. For example, a user of the device may take a picture of an object using a camera associated with the device. A voice recording of the user's voice is then recorded by the device. The device then creates a mixed media communication using the picture of the object and the recording of the user's voice. The mixed media message is then sent to a second device. The mixed media message may comprise more than one image or more than one audio message and may also include other components such as video, text, or animations.

The device may prompt the user to capture the audio message. For example, the device may capture an image and then may employ the user interface of the device to prompt the user to record an audio message. In one embodiment, the device may begin recording an audible message once the camera feature of the device has been activated or started. Once the camera is used to capture a picture, the device will stop recording the audio message and automatically associated the audio message with the picture to create the mixed media communication which is then sent to the second device. In one embodiment, the image is an image selected from a video such as a video conference that was recorded using the device. The audio may be a segment of the audio from the video conference.

The second device is capable of receiving the mixed media communication. A user may access or open the mixed media message at the second device. Upon accessing the mixed media message the second device may automatically display the image and play the audio message. Thus, a device may send an image to another device with an audio message that may serve as a title to the communication or image or may relay another type of audible message.

In one embodiment, the mixed media communication is an image with a video related to the image. For example, the first device may capture an image of an object and then capture a video of the user where the video features the user including an audio portion of the user's voice recorded. The user may be describing the image of the object or may offer other information. The image and video may be captured using two different cameras associated with the first device. The communication may then be sent the second device such that the image and the video may playback or be displayed on the second device simultaneously upon the second device accessing the communication.

The first device may also be able to edit, filter, or otherwise modify the communication before it is sent. For example, the video portion may be edited, modified, changed, shortened, effects added, etc. via a user interface that provides options to a user. The captured image may also be animated, cropped, filtered, effects added, text added, etc. The device may also offer options to a user for how the mixed media communication will be displayed on another device. For example, the device may offer the user a choice of whether a video is displayed in the foreground while the image is displayed in the background or vice versa.

Methods and Systems for a Mixed Media Communication

FIG. 1 depicts an embodiment of device 100. Device 100 is configured for participation in a mixed media communication. Device 100 may be capable of creating a mixed media communication, sending or receiving a mixed media communication, or displaying a mixed media communication. The mixed media communication may comprise any number of combinations of media including audio portions, image portions, video portions, text portions, animation, effects, including a plurality of any of these items. It should be appreciated that device 100 may be a smart phone, a cell phone, a desktop computer, a laptop, a notebook, a netbook, a hand held device, a personal digital assistant, a television, or similar electronic device capable of participating in multi-media digital communication across a network.

In one embodiment, device 100 is able to send and receive communications. Such communications may be mixed media communications that are captured using multimodal sensors where the communication is for social communication between users. One example of a mixed media communication is an image with a corresponding audio portion or message that plays back on the device when the picture is displayed. Such an image with a corresponding audio portion may be described as an audible picture or a victure where v stands for voice and "icture" is derived from the term picture. Device 100 may be built exclusively for creating, sending and receiving mixed media communications or may be a device that serves other functions as well. For example, device 100 may be a smart phone that employs an operating system. In one embodiment, the present technology may deploy on the smart phone as an application or app. The app may include a user interface and makes use of the hardware features of the device to capture media, create communications, send and receive communications, and display or play back communications. The communication may also be described as a message or messaging.

For clarity and brevity, the discussion will focus on the components and functionality of device 100. However, device 200 of FIG. 2 and device 300 of FIGS. 3A and 3B operate in a similar fashion and have similar capabilities as device 100. In one embodiment, device 200 and device 300 are the same as device 100 and includes the same components as device 100.

Device 100 includes display 110, mixed media communication creator 120, transceiver 140, image capturing device 150, image capturing device 151, microphone 152 and speaker 154. Device 100 optionally includes global positioning system 160.

Display 110 is configured for displaying images, pictures, text, animations, effects, mixed media communications, user interfaces, etc. Display 110 is further configured for displaying images or video captured by device 100 or for displaying images, pictures, videos or communications captured by another device and received by device 100. In one embodiment, display 110 is a touchscreen and is able to display a user interface with regions that can be pressed or selected by the user to initiate commands.

Transceiver 140 is for transmitting and receiving data related to a communication such as text, speech, audio, video, animations, or the communication itself. Transceiver 140 may operate to send and receive a communication over a network to another device. For example, the network may be a cellar network such as 3G or 4G network. In other embodiments, the network may be a Wi-Fi network, a Bluetooth network, a near field communication, or other network for sending and receiving electromagnetic radio signals. In one embodiment, the network is part of or is in communication with the Internet. A communication may be sent directly from one device to another or may be routed or relayed through other devices or servers. For example, a peer-to-peer network may be employed or a central server that links devices together or identifies devices via contact information.

Image capturing device 150 is an image capturing devices for capturing images, video, or pictures at device 100 such as a digital camera or video camera. It should be appreciated that device 100 may also include an additional camera (e.g., image capturing device 151) on a back face of device 100 facing opposite image capturing device 150. Microphone 152 is for capturing audio at device 100. Speaker 154 is for generating an audible signal at device 100 such as the audio stream of a communication from another device. Global positioning system 160 is for determining a location of a device 100.

Device 100 may capture an image, video, or audio in response to a command from a user. Such a command from a user may cause device 100 to automatically prompt the user to generate more content which is then captured by device 100. For example, a user may capture an image or select an image that was previously captured. Device 100 may then prompt the user to generate audio to be captured by microphone 152. The audio may be a voice description of the captured image. Mixed media communication creator 120 may then combine the image and the audio to create a mixed media communication. Transceiver 140 may then send the mixed media communication to another device. Alternatively, the user may manually command device 100 to capture additional content and associated it with other content already captured. Thus a mixed media communication may be created from more than one type of media content. The mixed media communication may be a picture with an audio message in place of a title or a text message or may be in place of a description of the picture. In one embodiment, the mixed media communication comprises no text for the title or other description of the mixed media communication.

Device 100 is also able to participate in video conference with another device such as a handheld device or a computer. During a video conference, image capturing device 150 captures video at device 100. For example, image capturing device 150 captures video of a user or other object. Microphone 152 may simultaneously captures audio signals corresponding to the captured video signal at device 100. Similarly, a second device may also be capturing audio and video. The two devices may then exchange the video and audio. Device 100, in a video conference, may be able to display a real time or live video stream captured by a second device and simultaneously display video captured by device 100 in two different regions of display 110. The video conference may also include a plurality of devices. The audio and video from the plurality of devices may be displayed via device 100.

Device 100 may be capable of recording the video conference which may include audio from and video from multiple devices.

In one embodiment, device 100 is capable of capturing a screen shot of the video conference. The screen shot may also be described as a snapshot or a still frame of the video. The screen shot may include images from multiple video source or video from only one source. The screen shot may be selected by a user or may be randomly selected by mixed media communication creator 120. The screen shot may be captured during the video conference or may be captured using a recording of the video conference. The user may then create an audio portion for the mixed media communication or the audio portion may be a segment of the audio from the video conference. For example, a screen shot may be selected and the audio may be a segment of the audio from the video conference that occurred near the time the screen shot was taken such as a few second before and a few seconds after the screen shot occurred in the timeline of the video conference. The audio portion may be automatically added to the mixed media communication via mixed media communication creator 120 or the audio may be selected by a user. However, the audio portion may come from any segment of the video conference and need not be the audio that was created currently with the screen shot in the timeline of the video conference.

Using the present technology, a user may send a mixed media communication that comprises a great deal of information without requiring the user to type the information as text and instead the user can use his or her voice to generate the information. Additionally, a mixed media communication that comprises only an image and audio or an image, audio and text generally is smaller in data size than a communication that includes a video. Moreover, an image may be captured at a higher resolution than a video and the mixed media communication with a high resolution image and audio will still have a small data size compared to a video. A communication with a smaller data size is easier to send across a network and may be sent faster. Additionally, a picture is static whereas a video is fluid. In some instances it is easier for a user to provide a description of a static picture compared to a fluid video especially if the video has its own audio track.

In one embodiment, the captured content for the mixed media communication may include location data of where the content was captured. The location data may be generated via a global positioning system 160.

Mixed media communication creator 120 may be able to create a mixed media communication with a plurality of images, audio portions, videos, animations, or any combination thereof. In one embodiment, the content of the mixed media communication need not be generated or captured by device 100. For example, device 100 may receive an image or other content from another device or may download an image from the Internet which is then employed by mixed media communication creator 120 to create the mixed media communication.

The audio portion or message need not be voice but can be music or other audible sounds. In one embodiment, the audio portion relates to the image, video or other content of the mixed media communication. Specifically, the audio message may be a verbal description of what is in an image or video. For example, a user may take a picture of a skin condition and then audibly describe the skin condition using the user's voice. The audio and image may then comprise a mixed media communication which is sent to a medical professional. In another example, the user may be on vacation and capture an image of an important landmark and then device 100 will capture an audio message from the user describing the landmark. In one embodiment, the audio is not a message and does not relate to the other content of the mixed media communication.

It should be appreciated that device 100 may capture audio and images in any number of sequences. In one embodiment, the audio is first captured and the image is later captured. For example, the user may command device 100 to start the viewfinder for the camera at which point device 100 automatically begins capturing audio. Once device 100 receives a command to take a picture then device 100 automatically ends the audio capture and creates the mixed media communication. In one embodiment, device 100 first captures an image or a user selects a pre-captured image and then device 100 captures audio for the mixed media communication. In one embodiment, device 100 captures an image and audio simultaneously. Once audio and an image have been captured or selected, device 100 may query user regarding whether other content or media should be included in the mixed media communication. The user may then indicate that another image, audio or video should be included in the mixed media communication.

In one embodiment, device 100 may begin recording audio and then captures a plurality of pictures as the audio is being captured. As each picture is captured it is time-stamped relative to the timeline of the audio being captured. Then mixed media communication creator 120 creates a mixed media communication that displays a first picture during the audio playback and then displays the second picture at the time at which the second picture was captured relative to the audio message's timeline. Thus the flow of the mixed media communication is controlled or driven by the audio and not the picture. This may be accomplished for any length of time and for any number of pictures. The amount of time may be pre-determined such that device 100 may automatically stop capturing audio after the pre-determined amount of time such as thirty seconds. Alternatively, device 100 may stop capturing audio and pictures after a pre-determined number of pictures have been captured. Device 100 may also have a limited on the data size of a mixed media communication and may stop capturing content once the data size has been reached.

After a mixed media communication is generated by mixed media communication creator 120, device 100 may prompt a user for information regarding which device the mixed media communication should be sent to. Device 100 may provide a library of contacts associated with the app for the present technology, may access contacts associated with the operating system of device 100, or a contact may be manually entered by the user.

Device 100 or another device may be capable of receiving a mixed media communication. When device 100 receives a mixed media communication it may alert a user of the mixed media communication using any number of standard alerts associated with a device receiving a message or communication. The user may then command device 100 to open or access the mixed media communication. In one embodiment, mixed media communication creator 120 creates the mixed media communication such that when the mixed media communication is accessed by a device it automatically displays the different portions of content in the mixed media communication. For example, if the mixed media communication comprises an image and an audio message, once the mixed media communication is accessed, the receiving device will display the image and play back the audio automatically. If there is more than once image or audio message then mixed media communication creator 120 may automatically select an order in which to play the content and automatically determine how long to display an image before displaying a subsequent image. However, more than one image may be displayed simultaneously using split screen techniques, picture-in-picture techniques, or displaying one image in the background and one image in the foreground with portions of the two images overlapping one anther. The same may be true of a plurality of videos or a combination of videos and images. In one embodiment, the user may manually select and order and/or length of play back of different portions of content in the mixed media communication.

Device 100 may also be capable of editing or filtering content in a mixed media communication. Images and videos may be cropped or brightness and color controlled or other standard editing techniques employed. Videos may be shortened. Animations and other effects may be added to the content of the mixed media communication. Device 100 may employ a user interface to receive command regarding such editing, filtering, altering, changing or other effects. Text and other effects may be superimposed over the top of a video or image. In one embodiment, a pinpoint may be added to identify an object in the image. For example, the pinpoint may be in the shape of an arrow or other indicator that points to an object such as a tree or a portion. The identified object in the image may also be a region of the image. In one embodiment, the image may be altered to such that a region of the image is magnified. This may be described as zooming in on a portion of the image. The magnified region may be the only portion of the image that is displayed in the mixed media communication.

In one embodiment, a mixed media communication may be sent to a website that hosts videos, pictures, or other content such that other users may access the content on demand or the website may automatically forward the content to designated users.

Figure 2:
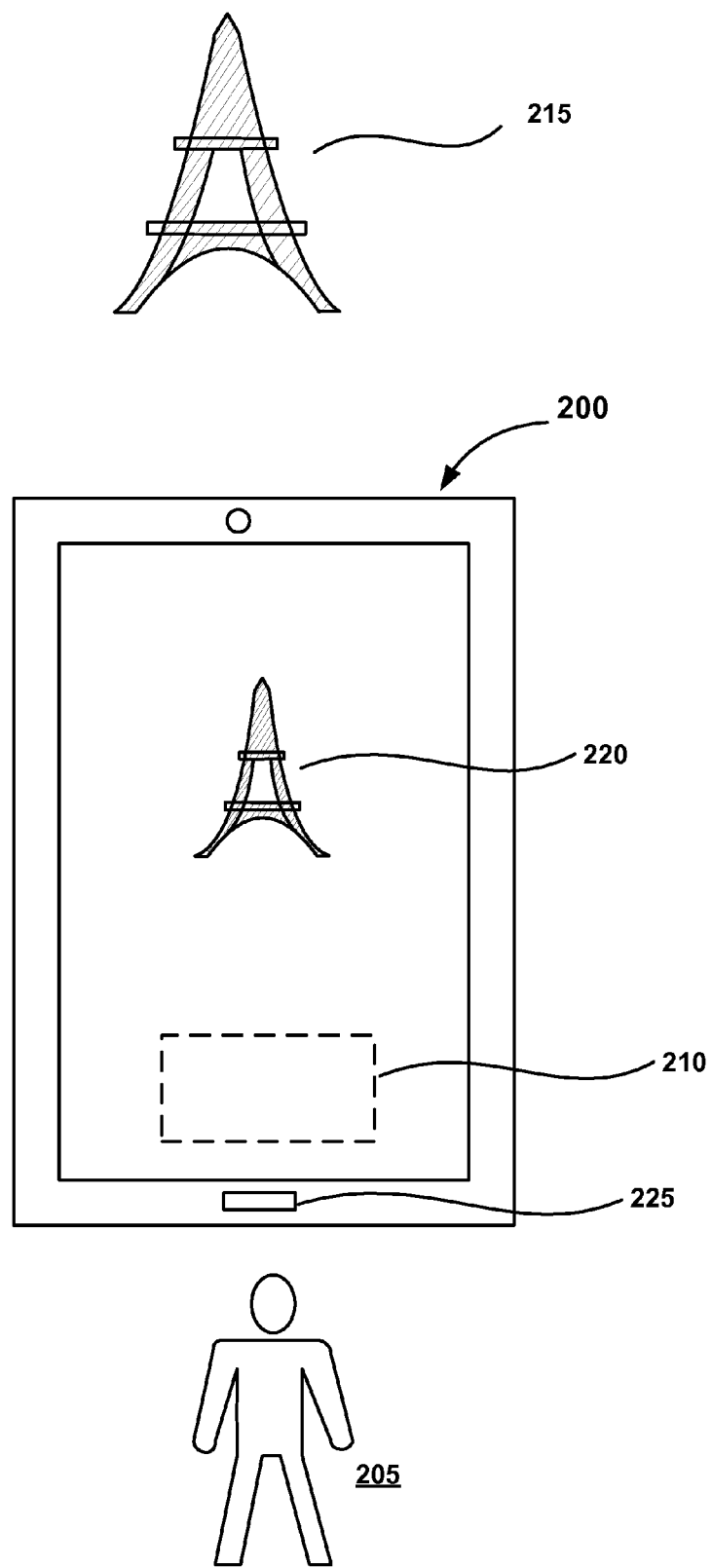
FIG. 2 illustrates a block diagram of an example device for communicating with a mixed media communication in accordance with embodiments of the present technology.

With reference now to FIG. 2, a block diagram of an example environment in accordance with embodiments of the present technology. FIG. 2 depicts device 200 with microphone 225 and region 210. FIG. 2 also depicts object 215 and user 205. Device 200 may be employed to capture image 220 of object 215. As can be seen, image 220 is a picture of object 215 which is depicted in FIG. 2 to be a structure or landmark such as a building. Device 200 may prompt user 205 to record an audio message related to image 220 which is then used to create a mixed media communication. Region 210 may be employed to prompt user 205 and may also be used to display other controls such as editing controls or controls for selecting a contact to send the mixed media communication to. In one embodiment, user 205 may be able to see image 220 on the display of device 200 while the audio message is being captured, or the audio may be captured before image 220 is captured.

With reference now to FIG. 3A, a block diagram of an example environment in accordance with embodiments of the present technology. FIG. 3A depicts a side view of device 300 comprising front camera 305, back camera 310 and microphone 312. FIG. 3A also depicts user 314 and object 320. In one embodiment, back camera 310 is used to capture a picture of object 320, front camera is used to capture a video of user 314 and microphone 312 is used to capture audio. The picture, video and audio are then employed to create a mixed media communication. The picture, video and audio can be captured simultaneously if device 300 has more than one camera. Alternatively, the picture, video and audio may be captured in any sequence or order and may or may not be captured by device 300 and its components.

In one example, device 300 captures a picture of object 320 and captures a video with an audio or voice track of user 314 explaining or providing information regarding object 320. For example, user 314 may explain why object 320 is significant or how user 314 travelled to object 314 or any other type of information. The picture, audio and video may then be employed to create a mixed media communication.

Figure 3B:
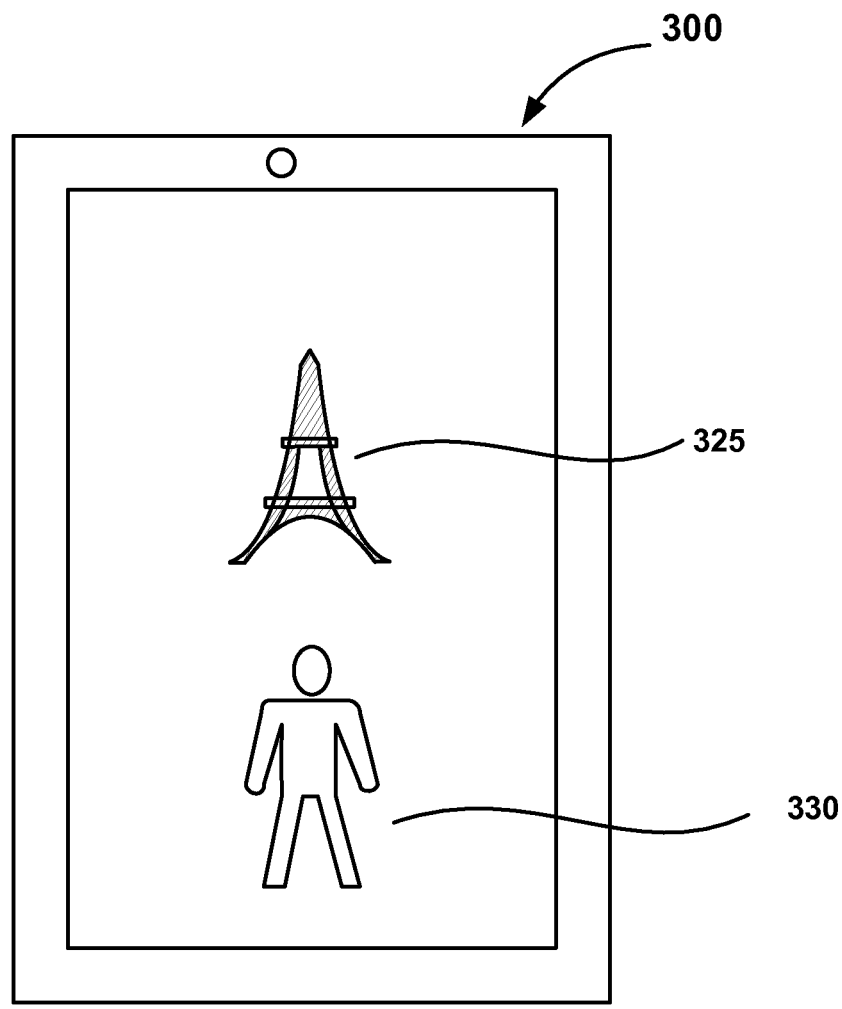
FIG. 3B illustrates a block diagram of an example device for communicating with a mixed media communication in accordance with embodiments of the present technology.

With reference now to FIG. 3B, a block diagram of an example environment in accordance with embodiments of the present technology. FIG. 3B depicts a front view of device 300 showing a playback of the mixed media communication created using the picture, audio and video captured as described in FIG. 3A. Image 325 is a picture of object 320 and video 330 is a video of user 314. The mixed media communication is displayed such that image 325 is displayed in a continuous static fashion while video 330 is displayed as a video while at the same time the audio message is played back. Thus the mixed media communication may display a picture and a video of the user explaining or providing information regarding the picture. The video may be helpful to show facial features, body language, or gestures of the user which aid in the communication. Video 330 and image 325 may be displayed in separate regions of the display of device 300 using split screen techniques or picture-in-picture techniques. However, video 330 and image 325 may also be displayed in the same region where they overlap one another. For example, image 325 may comprise the whole of the display and be in the background while video 330 is in the foreground on top of image 325. Conversely, image 325 may be in the foreground with video 330 in the background.

It should be noted that the various embodiments described herein can also be used in combination with one another. That is one described embodiment can be used in combination with one or more other described embodiments.

Operations of Mixed Media Communications

Figure 4:
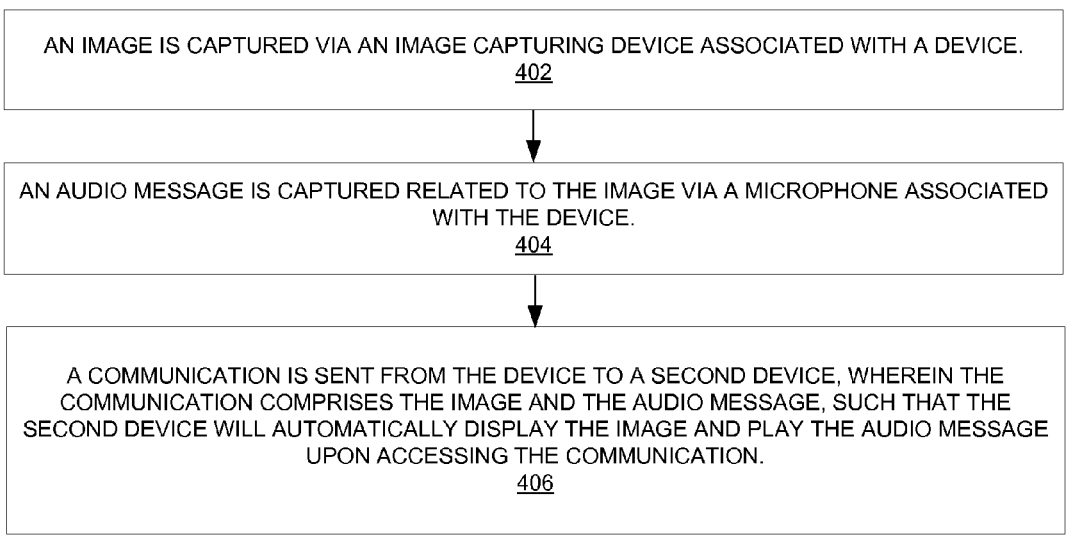
FIG. 4 illustrates a flowchart of an example method for communicating with a mixed media communication in accordance with embodiments of the present technology.

FIG. 4 is a flowchart illustrating process 400 for communicating with a mixed media communication in accordance with one embodiment of the present technology. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 400 is performed by the components of FIGS. 1, 2, 3A, and/or 3B.

At 402, an image is captured via an image capturing device associated with a device. A plurality of images may be captured. Other content may also be captured such as video. In one embodiment, the image is a snap shot of a video such as a video conference.

At 404, an audio message is captured related to the image via a microphone associated with the device. The audio may be directly describing the image such as a voice description of the image or may be music, sound effects, or other audible sounds. In one embodiment, the audio does not describe the image or is not typically associated with the image but is related to the image simply because it is selected to be combined with the image in a mixed media communication. In one embodiment, the device prompts a user to capture audio related to the image or prompts a user to capture audio in anticipation of an image to be captured. The audio message and the image may be captured in sequence one before the other or simultaneously. The audio message may be a portion of an audio stream captured during a video conference.

At 406, a communication is sent from the device to a second device, wherein the communication comprises the image and the audio message, such that the second device will automatically display the image and play the audio message upon accessing the communication. The communication may be a mixed media communication and may be sent over a cellular network. The communication may comprise any number of additional portions comprised of a variety of content including text, animations, images, videos, effects, audio, etc. The image may be altered to include a pinpoint identifying an object or region of the image or may be altered to zoom in and magnify a region of the image.

Figure 5:
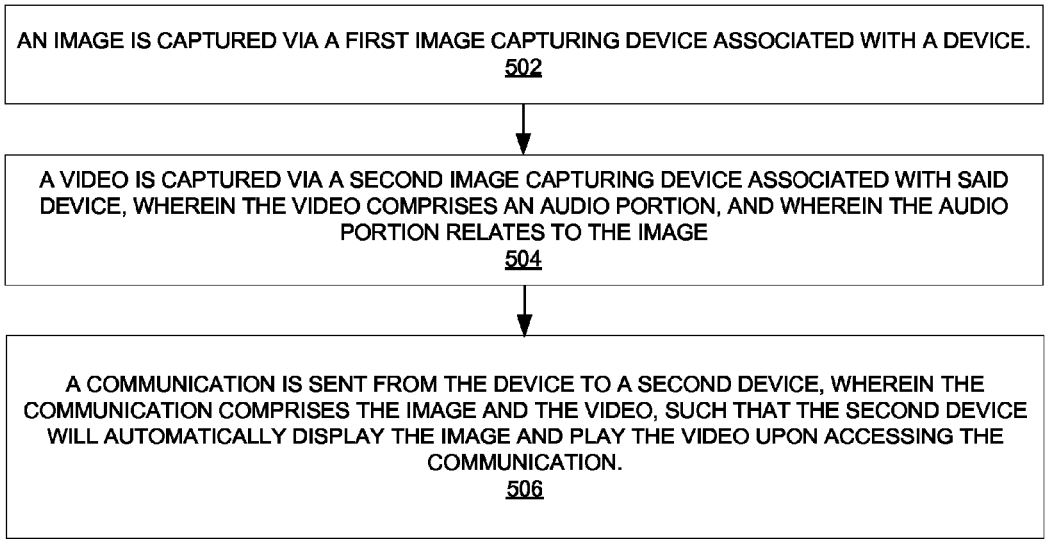
FIG. 5 illustrates a flowchart of an example method for communicating with a mixed media communication in accordance with embodiments of the present technology.

FIG. 5 is a flowchart illustrating process 500 for communicating with a mixed media communication in accordance with one embodiment of the present technology. In one embodiment, process 500 is a computer implemented method that is carried out by processors and electrical components under the control of computer usable and computer executable instructions. The computer usable and computer executable instructions reside, for example, in data storage features such as computer usable volatile and non-volatile memory and may be non-transitory. However, the computer usable and computer executable instructions may reside in any type of computer usable storage medium. In one embodiment, process 500 is performed by the components of FIGS. 1, 2, 3A, and/or 3B.

At 502, an image is captured via a first image capturing device associated with a device.

At 504, a video is captured via a second image capturing device associated with said device, wherein the video comprises an audio portion, and wherein the audio portion relates to the image.

At 506, a communication is sent from the device to a second device, wherein the communication comprises the image and the video, such that the second device will automatically display the image and play the video upon accessing the communication. The communication may display the video and the image concurrently with the image in a foreground and the video in a background. The communication may display the video and the image concurrently with the image in a background and the video in a foreground. The communication may be a mixed media communication and may comprise additional portions of content. The video may be altered or edited before it is incorporated into the communication.

Various embodiments are thus described. While particular embodiments have been described, it should be appreciated that the embodiments should not be construed as limited by such description, but rather construed according to the following claims.

Example Computer System Environment

Portions of the present technology are composed of computer-readable and computer-executable instructions that reside, for example, in computer-usable media of a computer system or other user device such as a smart phone used for mixed media communication. Described below is an example computer system or components that may be used for or in conjunction with aspects of the present technology.

It is appreciated that that the present technology can operate on or within a number of different computer systems including general purpose networked computer systems, embedded computer systems, cloud-based computers, routers, switches, server devices, user devices, various intermediate devices/artifacts, stand-alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include one or more signal generating and receiving device(s) coupled with a bus for enabling the system to interface with other electronic devices and computer systems. Signal generating and receiving device(s) of the present embodiment may include wired serial adaptors, modems, and network adaptors, wireless modems, and wireless network adaptors, and other such communication technology. The signal generating and receiving device(s) may work in conjunction with one or more communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, a handheld device, a smartphone, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method for communicating with a mixed media communication, said method comprising:
   automatically prompting, via a device, a user to generate audio content;
   in response to said automatically prompting, receiving a command to start a viewfinder of an image capturing device associated with said device;
   in response to said command, capturing said audio content, wherein said audio content is an audio message captured via a microphone associated with said device;
   capturing an image via said image capturing device;
   in response to said capturing said image, automatically ending said capturing said audio content; and
   sending a communication from said device to a second device, wherein said communication comprises said image and said audio message, such that said second device will automatically display said image and play said audio message upon accessing said communication.

2. The computer-implemented method of claim 1 wherein said communication is sent over a network where said network is selected from the group of networks consisting of: a cellular network and a wifi network.

3. The computer-implemented method of claim 1 wherein before said sending said communication, querying a user whether other content should be added to said communication.

4. The computer-implemented method of claim 1 wherein said communication comprises a plurality of images and said audio message is related to said plurality of images.

5. The computer-implemented method of claim 1 wherein said communication further comprises an additional portion wherein said additional portion is selected from the group of additional portions consisting of: a text message, an animation, an image, and a video.

6. The computer-implemented method of claim 1 wherein said capturing said image occurs before said capturing said audio message.

7. The computer-implemented method of claim 1 wherein said capturing said image occurs after said capturing said audio message.

8. The computer-implemented method of claim 1 wherein said capturing said image occurs during said capturing said audio message.

9. The computer-implemented method of claim 1 wherein said image is altered via a filter before said sending said communication.

10. The computer-implemented method of claim 9 wherein said image is altered to add a pinpoint identifying an object in said image.

11. The computer-implemented method of claim 9 wherein said image is altered to magnify a region of said image.

12. The computer-implemented method of claim 1 wherein said capturing said image comprises capturing a snapshot image of a video conference and said capturing said audio message comprises an audio portion of said video conference.

13. A device for communicating using a mixed media communication, said device comprising:
  an image capturing device for capturing an image further comprising a viewfinder;
  a microphone for capturing an audio message related to said image; and
  a mixed media communication creator for automatically prompting a user to generate audio content comprising an audio message such that capturing said audio content begins once a command is received to start said viewfinder and automatically ends once said image is captured, and for creating and sending a communication from said device to a second device, wherein said communication comprises said image and said audio message, such that said second device will automatically display said image and play said audio message upon accessing said communication.

14. The device of claim 13 said device further comprising: a second image capturing device for capturing images.

15. A computer-implemented method for communicating with a mixed media communication, said method comprising:
  capturing an image via a first image capturing device associated with a device;
  automatically prompting, via said device, a user to generate more content to associate with said image after said image has been captured;
  in response to said automatically prompting, capturing said more content, wherein said more content is a video captured via a second image capturing device associated with said device, wherein said video comprises an audio portion, and wherein said audio portion relates to said image; and
  sending a communication from said device to a second device, wherein said communication comprises said image and said video, such that said second device will automatically display said image and play said video upon accessing said communication.

16. The computer-implemented method of claim 15 wherein communication displays said video and said image concurrently with said image in a foreground portion of a display and said video in a background portion of said display.

17. The computer-implemented method of claim 15 wherein communication displays said video and said image concurrently with said image in a background portion of a display and said video in a foreground portion of said display.

18. The computer-implemented method of claim 15 wherein said capturing said video comprises capturing audio and video that relates to said image.

19. The computer-implemented method of claim 15 wherein said communication comprises a plurality of images and videos.

20. The computer-implemented method of claim 15 wherein said communication further comprises an additional portion wherein said additional portion is selected from the group of additional portions consisting of: a text message, an animation, an image, and a video.

21. The computer-implemented method of claim 15 wherein said capturing said image occurs before said capturing said video.

22. The computer-implemented method of claim 15 wherein said capturing said image occurs after said capturing said video.

23. The computer-implemented method of claim 15 wherein said video is altered via a filter before said sending said communication.

* * * * *